United States Patent
Suzuki

(10) Patent No.: US 8,564,642 B2
(45) Date of Patent: Oct. 22, 2013

(54) COMMUNICATION METHOD, COMMUNICATION SYSTEM, TRANSMISSION METHOD, TRANSMISSION APPARATUS, RECEIVING METHOD AND RECEIVING APPARATUS

(75) Inventor: Kazuyoshi Suzuki, Tokyo (JP)

(73) Assignee: Sony Corporation (JP)

( * ) Notice: Subject to any disclaimer, the term of this patent is extended or adjusted under 35 U.S.C. 154(b) by 1383 days.

(21) Appl. No.: 11/800,989

(22) Filed: May 8, 2007

(65) Prior Publication Data

US 2007/0296859 A1 Dec. 27, 2007

(30) Foreign Application Priority Data

May 16, 2006 (JP) ................................ P2006-136919
Apr. 12, 2007 (JP) ................................ P2007-105061

(51) Int. Cl.
*H04N 15/00* (2006.01)
*H04N 13/00* (2006.01)

(52) U.S. Cl.
USPC .............................. 348/43; 348/42; 348/489

(58) Field of Classification Search
None
See application file for complete search history.

(56) References Cited

U.S. PATENT DOCUMENTS

| 4,974,074 A | * | 11/1990 | Tenma ............................ 348/43 |
| 7,215,356 B2 | * | 5/2007 | Lin et al. ........................ 348/51 |
| 2004/0095509 A1 | | 5/2004 | Okamoto et al. |
| 2004/0218269 A1 | * | 11/2004 | Divelbiss et al. ............. 359/464 |
| 2007/0139624 A1 | * | 6/2007 | DeCusatis et al. ............. 353/84 |

FOREIGN PATENT DOCUMENTS

| JP | 11-234702 | | 8/1999 |
| JP | 2001-346202 | | 12/2001 |
| JP | 2006-013851 | | 1/2006 |
| WO | WO-02/078336 A1 | | 10/2002 |
| WO | WO2005/057932 | * | 6/2005 |

* cited by examiner

*Primary Examiner* — Jefferey Harold
*Assistant Examiner* — Michael Teitelbaum
(74) *Attorney, Agent, or Firm* — Lerner, David, Littenberg, Krumholz & Mentlik, LLP

(57) ABSTRACT

A communication method of transmitting video data which may include a predetermined number of bits as a unit from a source device to a sink device in sync with pixel clock and using individual transmission lines for respective color data or the like, may include preparing video data for three-dimensional display including the video data for a left eye and the video data for a right eye; forming the data for the left eye and for the right eye including the predetermined number of bits per pixel respectively; adding one of the data for the left eye and data for the right eye to the other thereof per pixel; forming the data of one pixel including twice the predetermined number of bits and transmitting the data at a timing in sync with the pixel clock; and transmitting the data for three-dimensional display from the source device to the sink device.

11 Claims, 11 Drawing Sheets

| Byte | 7 | 6 | 5 | 4 | 3 | 2 | 1 | 0 |
|---|---|---|---|---|---|---|---|---|
| 0 | | Tag Code | | | Data Length | | | |
| 1 | | | | | | | | |
| 2 | Identification Code | | | | | | | |
| 3 | | | | | | | | |
| 4 | A | | | | B | | | |
| 5 | C | | | | D | | | |
| 6 | Support 24 Bits | Support 48 Bits | Support 36 Bits | Support 30 Bits | Support Information of 3D Image | | | |
| 7…N-1 | Not Defined | | | | | | | |
| N | Not Defined | | | | | | | |

FIG. 7

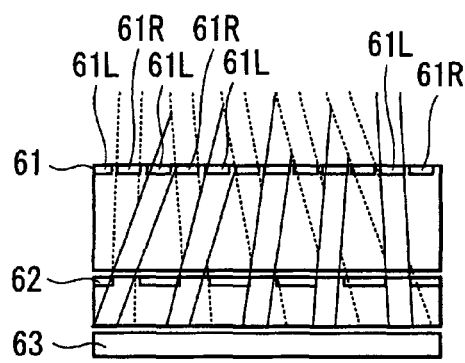
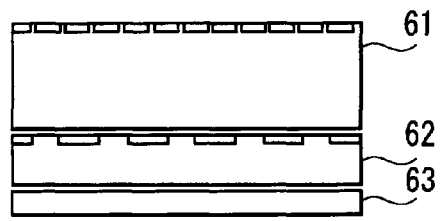
FIG. 9A  FIG. 9B
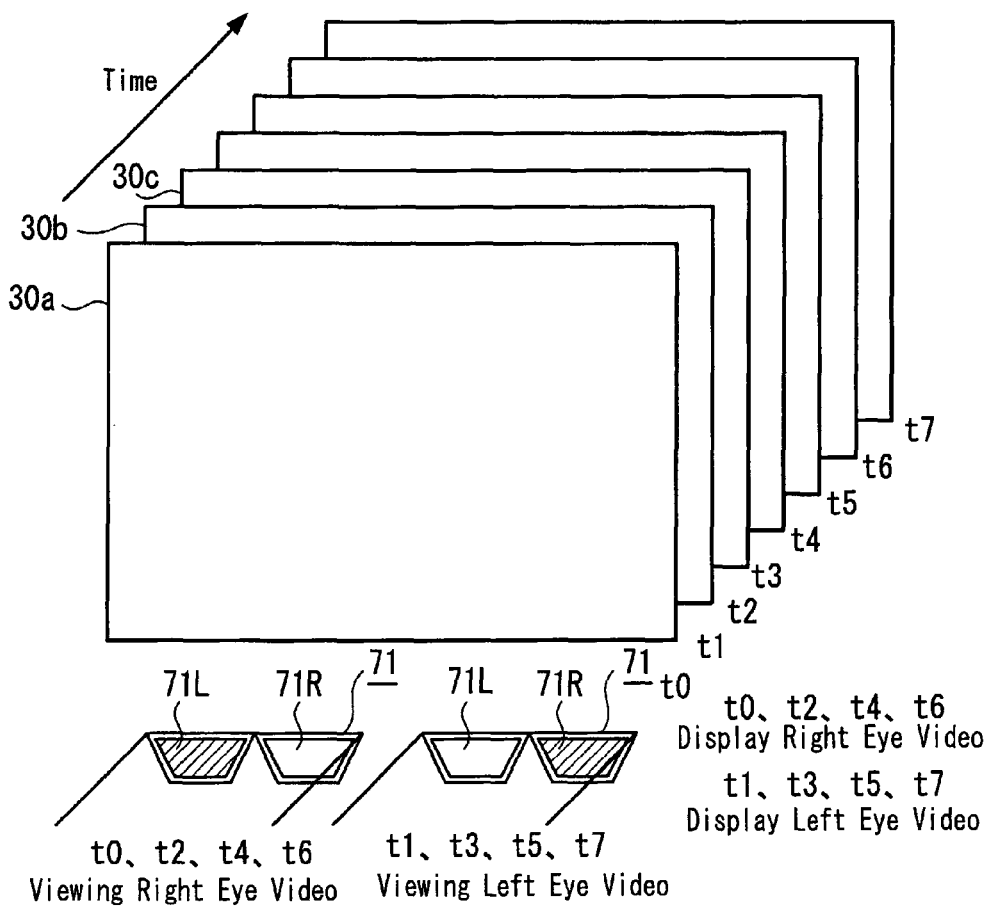
FIG. 10

COMMUNICATION METHOD, COMMUNICATION SYSTEM, TRANSMISSION METHOD, TRANSMISSION APPARATUS, RECEIVING METHOD AND RECEIVING APPARATUS

CROSS REFERENCES TO RELATED APPLICATIONS

This application claims priority from Japanese Patent Application No. JP 2006-136919 filed in the Japanese Patent Office on May 16, 2006 and Japanese Patent Application no. JP 2007-105061 filed in the Japanese Patent Office on Apr. 12, 2007, the entire contents of which are incorporated herein by reference.

BACKGROUND OF THE INVENTION

1. Field of the Invention

The present invention relates to a communication method and a communication system which are suitable for being applied to a digital video/audio input/output interface standard called the HDMI (High-Definition Multimedia Interface) standard and relates to a transmission method, a transmission apparatus, a receiving method and a receiving apparatus which are applied to the communication system. Particularly, the present invention relates to technology for transmitting video data for three-dimensional display using the digital video/audio input/output interface standard.

2. Description of the Related Art

Lately, the HDMI standard has been developed as an interface standard to transmit uncompressed digital video data and the like between a plurality of video apparatuses. According to the HDMI standard, video data is transmitted as individual primary color data respectively transmitted by one pixel. In the HDMI standard, audio data is also transmitted using a transmission line for the video data in a blanking period of the video data. Additive primary color data of three channels that are red, green and blue (R-data, G-data, and B-data) are transmitted as the primary color data. Luminance and color-difference signals such as Y, Cb and Cr may be transmitted instead of the primary color data.

According to the HDMI standard, one pixel data of respective colors is basically transmitted by 8 bits. Synchronization signals such as a horizontal synchronization signal and a vertical synchronization signal are also transmitted at a timing that each synchronization signal is arranged. A video data transmission line using pixel clock and a control data transmission line are provided.

FIG. 1 is a schematic diagram showing an example of the case in which the primary color data (R-data, G-data and B-data) are transmitted using an interface of the HDMI standard. Three channels of channel 0, channel 1 and channel 2 are provided to video data, and the R-data, G-data and B-data are individually transmitted. FIG. 1 shows an example of a period for transmitting data composed of four pixels of pixel 0, pixel 1, pixel 2 and pixel 3, and one pixel data in each channel includes 8 bits.

More specifically, the channel 0 is used for the B-data (blue data) and B0 data of 8 bits is transmitted during a period of the pixel 0, and subsequently B1 data, B2 data and B3 data of 8 bits are sequentially transmitted in sync with the pixel clock (not illustrated). The channel 1 is used for the G-data (green data) and G0 data of 8 bits is transmitted during the period of the pixel 0, and subsequently G1 data, G2 data and G3 data of 8 bits are sequentially transmitted in sync with the pixel clock. The channel 2 is used for the R-data (red data) and R0 data of 8 bits is transmitted during the period of the pixel 0, and subsequently R1 data, R2 data and R3 data of 8 bits are sequentially transmitted in sync with the pixel clock.

Although not illustrated in FIG. 1, the control data and the pixel clock are transmitted using other channels according to the interface of the HDMI standard. The control data can be transmitted from a video data transmission device (source device) to a video data receiving device (sink device), and can also be transmitted from the receiving device (sink device) to the transmission device (source device). Further, data is encoded by 8 bits in the source device, and the encoded data is decoded by 8 bits in the sink device.

As described above, one pixel is transmitted by 8 bits per color according to the interface of the HDMI standard.

WO2002/078336 discloses details of the HDMI standard.

SUMMARY OF THE INVENTION

Lately, a display mode capable of displaying three-dimensional images has been put into practical use as a video display mode. According to a basic principle of displaying the three-dimensional image, an image for the left eye and an image for the right eye are separately displayed. Further, the images respectively displayed are individually incident on the left eye and the right eye of a viewer to recognize the three-dimensional image. As a processing method of individually displaying the images for the left eye and for the right eye, there are an example of using liquid crystal shutters with which the images for the left eye and for the right eye are individually incident on respective eyes, an example of using polarization filters to separate the images for respective eyes, and the like.

In any of the above-described processing methods, it may be necessary for the two video data for the left eye and for the right eye to be transmitted in synchronization. Accordingly, in the case of displaying a three-dimensional image, there has been such a problem in related art that two video transmission lines with which the video data for the left eye and the video data for the right eye are transmitted may be required as those (video cables) for transmitting video data from a video signal source to a display apparatus. Therefore, a connection configuration may be complicated.

A configuration in which the video data for the left eye and the video data for the right eye are multiplexed and transmitted through one video transmission line may be employed. However, the transmission configuration that is exclusive for the three-dimensional video transmission may be necessary in that case, and there has been such a problem that the transmission configuration is not compatible with that of a typical video display not displaying three-dimensional images.

It is desirable to transmit video data for three-dimensional display comparatively readily using an existing video data transmission standard such as the HDMI standard.

According to an embodiment of the present invention, video data may be transmitted using a system for transmitting the video data which may include a predetermined number of bits as a unit from a source device to a sink device in sync with pixel clock and using individual transmission lines for respective color data. Further, the video data for three-dimensional display may include the video data for the left eye and the video data for the right eye to be transmitted from the source device to the sink device, in which the video data for the left eye and the video data for the right eye respectively may include the above-described predetermined number of bits per pixel. Furthermore, one of the video data for the left eye and video data for the right eye may be added per pixel to the other including the predetermined bits, thereby the video data of one pixel including the data having twice the predetermined number of bits. The data having twice the predetermined number of bits may be transmitted at a timing synchronized with the pixel clock, thereby transmitting the video data for three-dimensional display.

Accordingly, one of the video data for the left eye and the video data for the right eye may be transmitted as data added to the other of the video data using a set of transmission lines, thereby enabling the transmission system to be applied to the transmission standard capable of transmitting video data having a large number of bits.

In order to obtain the above-described transmission system, it is proposed that the number of bits per pixel of each color may be selected to be 8 bits or more. For example, the number of bits per pixel of each color may be set to 16 bits.

FIG. 2 shows an example of the transmission state assuming that the data of 16 bits per pixel of each color is transmitted using the interface of the HDMI standard. As described above, according to the HDMI standard, data may be transmitted by 8 bits, and the 8 bits may be transmitted using one pixel clock period. Therefore two pixel clock periods may be required in order to transmit the data of 16 bits. In the example shown in FIG. 2, data of one pixel may be transmitted using two pixel clock periods. Phases 0, 1, 2 and 3 shown in FIG. 2 respectively may indicate one period of the pixel clock. As shown in FIG. 2, video data of 16 bits per pixel that is twice the number of bits can be transmitted using the two clock periods. It should be noted that the two pixel clock periods may be necessary for the transmission of one pixel in the case of the data transmission shown in FIG. 2, and therefore the pixel clock may also need to have twice the frequency correspondingly thereto.

According to the embodiment of the present invention, one of the video data for the left eye and the video data for the right eye may be added to the other thereof and may be transmitted so that the data transmission system can be applied to a transmission standard capable of transmitting the video data having the large number of bits, and therefore video data for three-dimensional display can be transmitted easily using the HDMI standard, for example. In addition, in the case where a display apparatus on the receiving side does not correspond to the three-dimensional display, reception processing disregarding the additional data may be performed, thereby maintaining compatibility between the video transmission for three-dimensional display and typical video transmission. Furthermore, the transmission mode may maintain the transmission unit of a predetermined number of bits (for example, 8 bits) in the transmission standard, and therefore in the case where the video data for the left eye and the video data for the right eye are transmitted simultaneously, encoding and decoding based on the unit of the predetermined bits can be performed in a state defined with the standard.

BRIEF DESCRIPTION OF THE DRAWINGS

FIG. 7 and is an explanatory diagram showing an example of configurations of VSDB data according to an embodiment of the present invention;

FIGS. 9A and 9B are explanatory diagrams showing an example of a three-dimensional display according to a parallax barrier method;

FIG. 10 is an explanatory diagram showing an example of a three-dimensional display according to a liquid crystal shutter method;

DETAILED DESCRIPTION

Hereinafter, an embodiment of the present invention is explained by referring to FIGS. 3 through 11.

Figure 3:
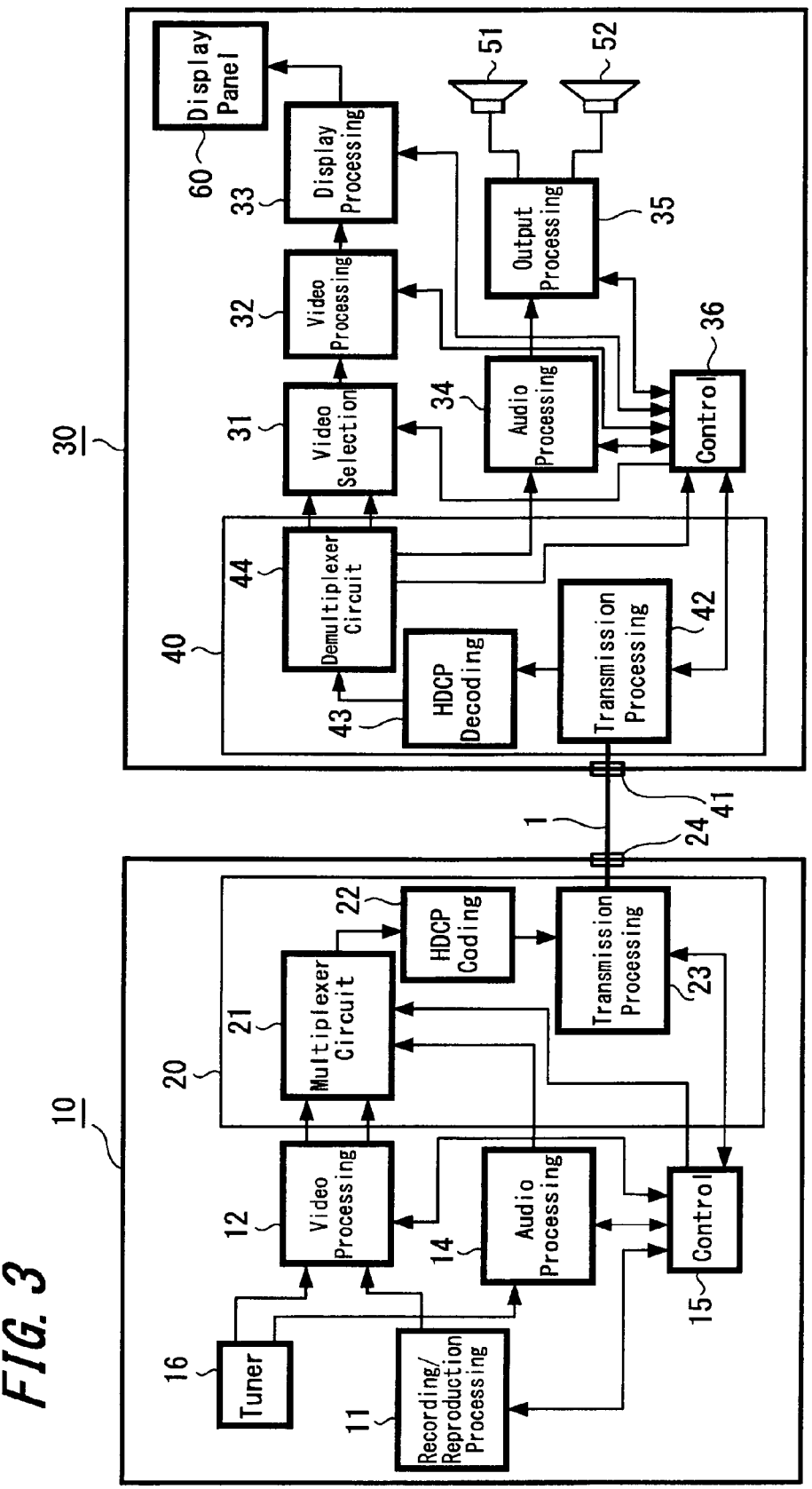
FIG. 3 is a block diagram showing an example of a system configuration according to an embodiment of the present invention.

The embodiment of the present invention is applied to a communication system in which video data and the like are transmitted from a source device to a sink device in the HDMI standard. FIG. 3 shows an example of a system configuration according to this embodiment, including a video recording/reproduction apparatus 10 representing the source device and a television receiver 30 representing the sink device which are connected using a HDMI cable 1, thereby transmitting video data and audio data from the video recording/reproduction apparatus 10 to the television receiver 30. In the video recording/reproduction apparatus 10 according to this embodiment, video data for three-dimensional (3D) display can be recorded and reproduced, and the television receiver 30 is capable of performing display processing on the three-dimensional images. Regarding the HDMI standard, a necessary configuration and the like are sequentially explained below, however the existing HDMI standard is basically applied without change and the configuration of the HDMI cable 1 is the same as that of related art.

First, the video recording/reproduction apparatus 10 is explained below. The video recording/reproduction apparatus 10 includes a recording/reproduction unit 11 and can record and reproduce video data and audio data. A hard disk drive (HDD) apparatus, for example, can be used as the recording/reproduction unit 11. In the case of recording the data for three-dimensional display in the recording/reproduction unit 11, the video data of two systems, which are the video data for the left eye and the video data for the right eye, are recorded for one video content. The video data reproduced and obtained in the recording/reproduction unit 11 is supplied to a video processing unit 12, and the audio data reproduced and obtained therein is supplied to an audio processing unit 14. In addition, the video recording/reproduction apparatus 10 includes a tuner 16, and video data and audio data obtained by receiving in the tuner 16 are supplied to the video processing unit 12 and the audio processing unit 14, respectively.

The video processing unit 12 processes the video data obtained from the reproduction or the reception into the video data for transmission. Here, in the case where the video data for three-dimensional display is processed in the video processing unit, the video data of two systems, which are the video data for the left eye and the video data for the right eye, are processed simultaneously. According to this embodiment, the video data for the left eye and the video data for the right eye respectively includes the data of 8 bits per pixel of each color (more specifically, the data of 24 bits per pixel of three colors in total).

The audio processing unit 14 processes the audio data obtained from the reproduction or the reception into the audio data for transmission.

The video data and the audio data, which are output from the video processing unit 12 and the audio processing unit 14, are supplied to a HDMI transmission processing unit 20. The HDMI transmission processing unit 20 is a circuit unit to perform transmission processing based on the interface of the HDMI standard and is formed of an integrated circuit, for example. The video data and the audio data that are supplied to the HDMI transmission processing unit 20 are multiplexed in a multiplexer circuit 21.

In the case where video data for three-dimensional display is reproduced, the video data for the left eye and the video data for the right eye are supplied to the recording/reproduction unit 11 in which the video data for the left eye and the video data for the right eye are multiplexed. Since each video data herein includes 8 bits per pixel of each color, a 16-bit period is used for the transmission of one pixel of one color such that the video data for the left eye is arranged in the first half of the transmission period of the 16 bits and the video data for the right eye is arranged in the second half thereof. The video data for the right eye arranged in the second half becomes data added to the video data for the left eye arranged in the first half. Note that, the video data for the right eye may be arranged in the first half and the video data for the left eye may be arranged in the second half. Details of the specific data arrangement and transmission state are described later.

The audio data is multiplexed and transmitted using the blanking period of the channel on which the video data is transmitted. Processing of arranging and transmitting the audio data in the blanking period is typical transmission processing formatted based on the HDMI standard.

The transmission data multiplexed in the multiplexer circuit 21 is encoded in a HDCP coding unit 22. The HDCP coding unit 22 encodes at least the channel for transmitting the video data based on the HDCP (High-bandwidth Digital Content Protection System) standard. The encoding in the HDCP coding unit 22 is performed on the data of 8 bits per channel as a unit.

The data encoded in the HDCP coding unit 22 is supplied to a transmission processing unit 23, in which the pixel data of each color is arranged on the individual channel and further a pixel clock channel, a control data channel and the like are set to have corresponding clock rate and data configuration, respectively, and then data are transmitted to the HDMI cable 1 connected to a HDMI terminal 24.

The HDMI cable 1 is connected to a HDMI terminal 41 of the television receiver 30. Next, a configuration of the television receiver 30 is explained below. The data transmitted through the HDMI cable 1 connected to the HDMI terminal 41 of the television receiver 30 is detected (received) in a transmission processing unit 42 that is included in a HDMI transmission processing unit 40 in sync with the pixel clock. The detected data on each channel is decoded in a HDCP decoding unit 43 from the data encoded at the time of transmission. The decoding performed here is also performed by 8 bits for each channel.

The decoded data is supplied to a demultiplexer circuit 44, in which the data multiplexed on each channel is separated. Here, the audio data arranged in the blanking period of the channel, in which the video is transmitted, is separated from the video data. In addition, the video data for the left eye and the video data for the right eye are separated in the case where the above-described video data is the video data for three-dimensional display. However, in the case of a mode not displaying three-dimensional images (typical display mode), one of those data (for example, the video data for the left eye) is retrieved as described later. Details of a processing example of retrieving one of those video data are described later when explaining a flow chart in FIG. 11.

Respective video data separated in the demultiplexer circuit 44 are supplied to a video selection unit 31. The video selection unit 31 selects one of the video data or combines video data based on a command received from a control unit 36 in the television receiver 30, and the selected or combined video data is supplied to a video processing unit 32. The video processing unit 32 performs necessary video processing on the supplied video data and supplies the processed video data to a display processing unit 33. The display processing unit 33 performs processing of driving a display panel 60. A specific example of the processing of displaying the three-dimensional image is described later.

The audio data separated in the demultiplexer circuit 44 is supplied to an audio processing unit 34 in which audio processing such as an analogue conversion is performed. The audio processing unit 34 supplies processed output to an output processing unit 35 in which processing such as amplification for speaker drive is performed. Subsequently, audio is output from speakers 51 and 52 connected to the output processing unit 35.

The control data separated in the demultiplexer circuit 44 is supplied to the control unit 36. It should be noted that the control data can also be transmitted from the control unit 36 in the television receiver 30 to a control unit 15 included in the video recording/reproduction apparatus 10 using the channel for transmitting control data.

Figure 4:
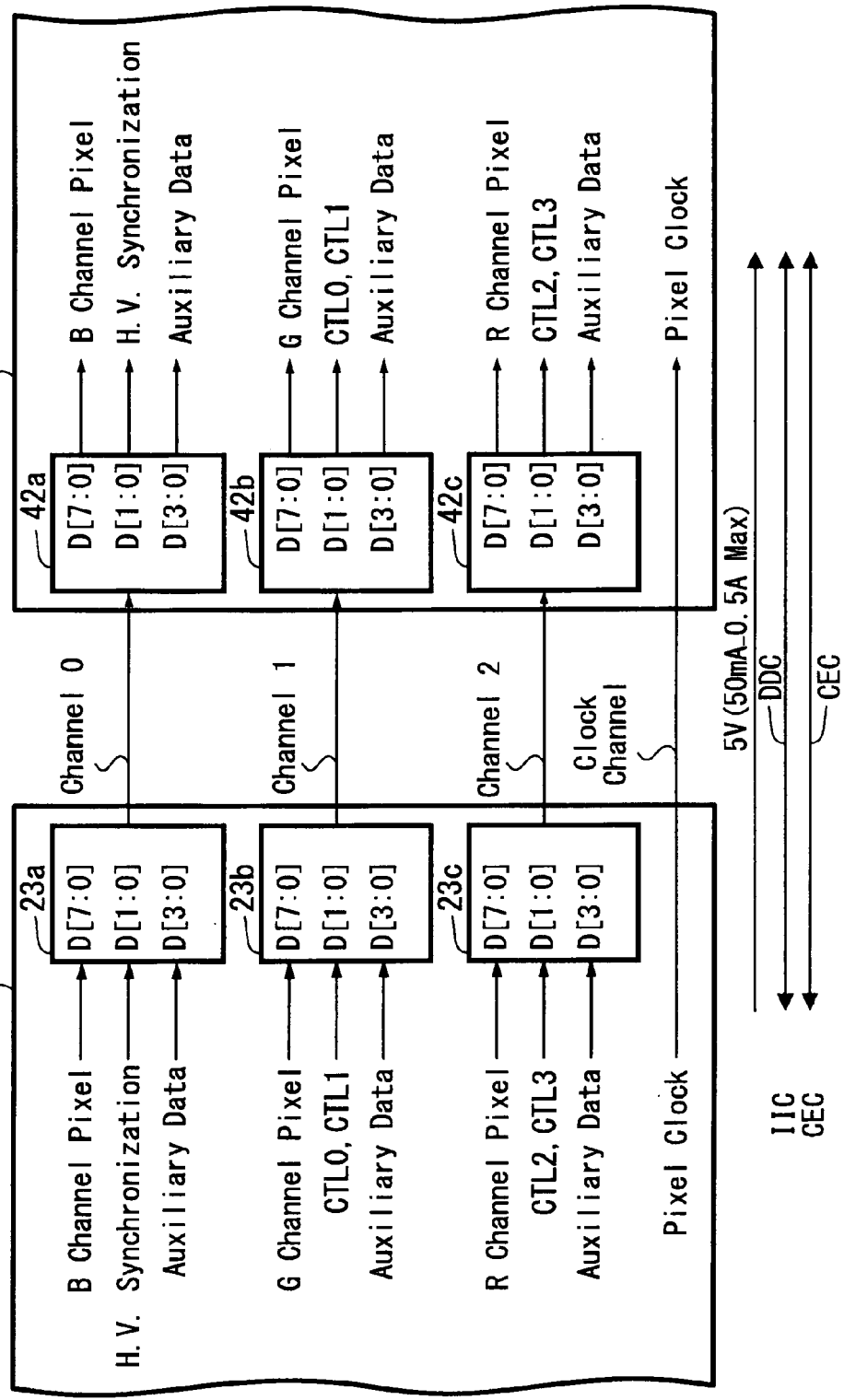
FIG. 4 is an explanatory diagram showing an example of configuration of a transmission channel according to an embodiment of the present invention.

FIG. 4 is a diagram showing an example of configuration of data on each channel transmitted through the HDMI cable 1 between the transmission processing unit 23 in the video recording/reproduction apparatus 10 and the transmission processing unit 42 in the television receiver 30. As shown in FIG. 4, three channels of channel 0, channel 1 and channel 2 are prepared in the HDMI standard as channels to transmit the video data, and further a clock channel to transmit pixel clock is prepared. In addition, a DDC (Display Data Channel) line and CEC (Consumer Electronics Control) line are prepared as control data transmission channels. The DDC line is a data channel mainly used for transmitting display control data, and the CEC line is a data channel mainly used for transmitting device control data between devices connected thereto.

The transmission processing unit 23 on the transmitting side includes data processing units (transmitting units) 23*a*, 23*b* and 23*c* prepared for respective channels to transmit video data, and the transmission processing unit 42 on the receiving side includes data processing units (data receiving units) 42*a*, 42*b* and 42*c* corresponding to respective channels to transmit video data.

A configuration of each channel is herein explained. The channel 0 is configured such that pixel data of B-data (blue data), vertical synchronization data, horizontal synchronization data and auxiliary data are transmitted. The channel 1 is configured such that pixel data of G-data (green data), two kinds of control data (CTL0, CTL1) and auxiliary data are transmitted. The channel 2 is configured such that pixel data of R-data (red data), two kinds of control data (CTL2, CTL3) and auxiliary data are transmitted.

Figure 5:
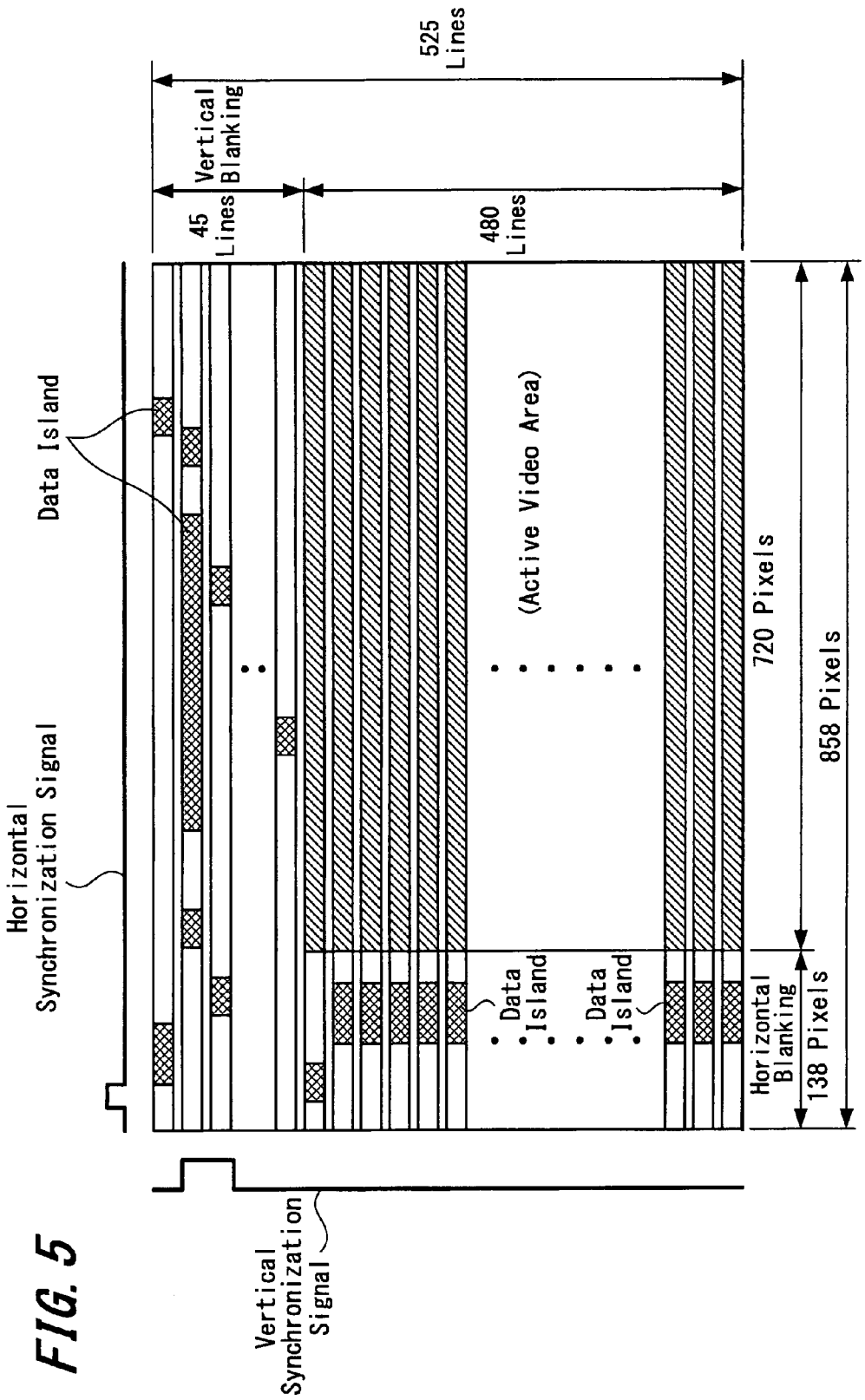
FIG. 5 is an explanatory diagram showing an example of configuration of a bit according to an embodiment of the present invention.

FIG. 5 is a diagram showing a line configuration and a pixel configuration in one frame of the video data which is transmitted in the transmission according to the embodiment. The video data (main video data) transmitted in this embodiment is uncompressed data (specifically, the video data formed by pixel) to which a vertical blanking period and a horizontal blanking period are added. Specifically, FIG. 5 shows an example of pixel data of 480 lines×720 pixels set as a video area displayed (shown as an active video area), and 525 lines× 858 pixels are set as the number of lines and pixels including the blanking periods, respectively. An area shown with double hatching (with left and right diagonal lines) in the blanking period is called a data island to which the auxiliary data can be added.

Next, there is explained a state in which video data is transmitted using the channel 0, channel 1 and channel 2 for transmitting pixel data in the transmission according to this embodiment. The transmission configuration according to this embodiment conforms to the HDMI standard, and the video data is transmitted based on the transmission configurations shown in FIGS. 1 and 2 in the case of transmitting typical video data (specifically, video data not for three-dimensional display). More specifically, in the case where one pixel of each color includes 8 bits, the 8-bit data that is the data of one pixel is respectively arranged and transmitted on the channels 0, 1 and 2 in sync with one pixel clock period (transmission processing of FIG. 1).

Figure 6:
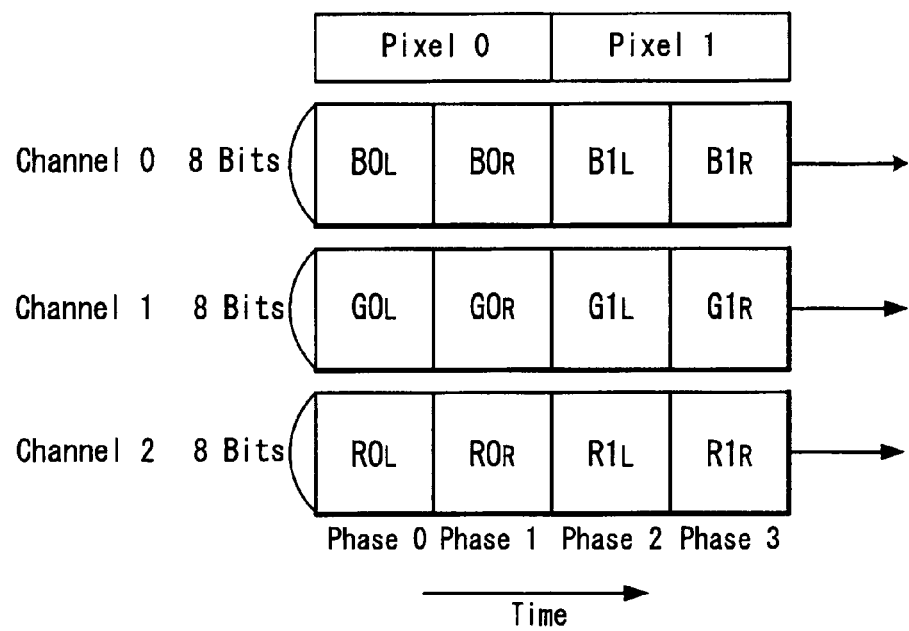
FIG. 6 is an explanatory diagram showing an example of data packing according to an embodiment of the present invention.

Further, in the case where video data for three-dimensional display is transmitted from the video recording/reproduction apparatus 10 to the television receiver 30, the transmission configuration is set as shown in FIG. 6. In this example, the left and right video data is set to have the same data amount such that the video data for the left eye in each color of B, G and R includes 8 bits per pixel and the video data for the right eye in each color of B, G and R also includes 8 bits per pixel. The left and right video data of one pixel is transmitted for two clock periods of the pixel clock that is transmitted on the clock channel. More specifically, the video data for the left eye in each color of B, G and R is transmitted respectively using the channels 0, 1 and 2 during the first half of the two pixel clock periods (phases 0 and 2 shown in FIG. 6). Further, the video data for the right eye in each color of B, G and R is transmitted respectively using the channels 0, 1 and 2 during the second half of the two pixel clock periods (phases 1 and 3 shown in FIG. 6). The first-half video data for the left eye and the second-half video data for the right eye are the data in the same pixel position. With respect to the blanking period, the data for blanking period having the same data configuration is transmitted in the first half and second half of the two pixel clock periods.

The transmission state shown in FIG. 6 is herein explained in detail. For example, in pixel 0, 8-bit blue data B$0_L$ for the left eye is transmitted at phase 0 regarding the B-data on the channel 0, and 8-bit blue data B$0_R$ for the right eye is transmitted at the following phase 1. 8-bit green data G$0_L$ for the left eye is transmitted at phase 0 regarding the G-data on the channel 1, and 8-bit green data G$0_R$ for the right eye is transmitted at the following phase 1. 8-bit red data R$0_L$ for the left eye is transmitted at the phase 0 regarding the R-data on the channel 2, and 8-bit red date R$0_R$ for the right eye is transmitted at the following phase 1. Here, in the case of transmitting the video data for three-dimensional display as shown in FIG. 6, it may be necessary to set the pixel clock rate twice the frequency as compared to the case of transmitting 8-bit video data per pixel of each color that is typical display shown in FIG. 1.

FIG. 7 shows an example in which video data for three-dimensional display has the above-described transmission configuration, and an multiplexed data example is indicated from the source side to the sink side using data called VSDB that indicates the configuration of the transmission data. The VSDB data is transmitted using the DDC line (see FIG. 4). In the case of the VSDB data of this example, data in the sixth byte shows the number of bits constituting one pixel in the data. In this embodiment, it is shown that the data has total 24 bits including 8 bits per pixel of each color. Further, whether three-dimensional data is transmitted or not is shown using a predetermined bit position.

Figure 1:
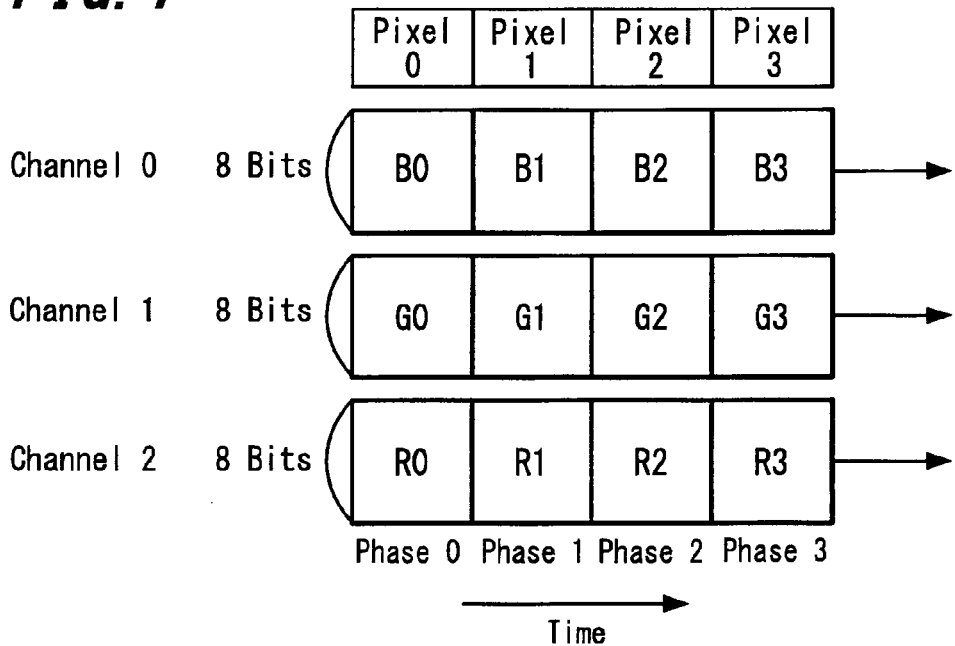
FIG. 1 is an explanatory diagram showing an example of data packing (an example of 8 bits per pixel) of the HDMI standard.
Figure 2:
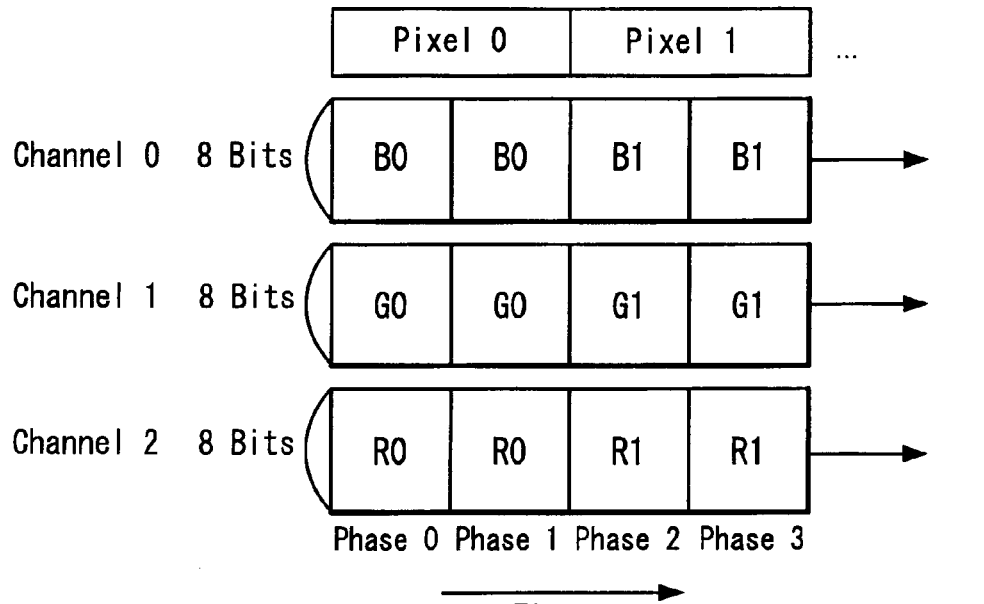
FIG. 2 is an explanatory diagram showing an example of data packing (an example of 16 bits per pixel) of the HDMI standard according to an embodiment of the present invention.

The control unit 36 (see FIG. 3) in the sink device (television receiver 30) detects the VSDB data, and determines whether the video data for three-dimensional display shown in FIG. 6 is transmitted or the typical video data shown in FIG. 1 or 2 is transmitted. Whether one pixel includes 8 bits in the example of FIG. 1 or one pixel includes 16 bits in the example of FIG. 2 is also determined by the sixth byte shown in FIG. 7 indicating the number of bits constituting one pixel in the data.

The control unit 36 in the television receiver 30 controls processing performed based on the determination to separate the video data for the left eye and the video data for the right eye from the received video data and to display the three-dimensional image using the respective video data.

Figure 8:
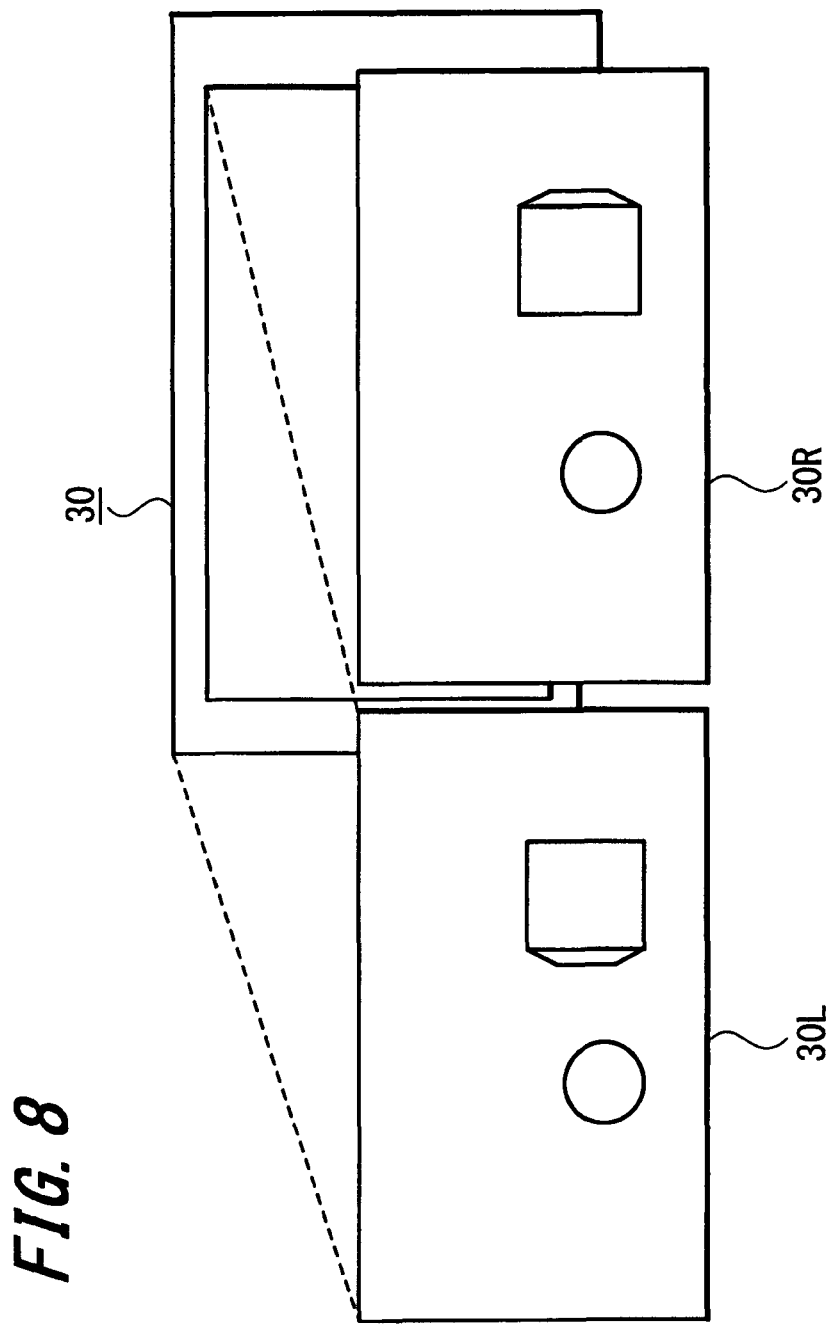
FIG. 8 is an explanatory diagram showing an example of left and right video displays according to an embodiment of the present invention.

FIG. 8 shows a display example of the three-dimensional image in the television receiver 30. As shown in FIG. 8, A display principle of the three-dimensional image is that an image 30L for the left eye and an image 30R for the right eye are displayed on a screen of the television receiver 30, and the respective images are individually incident on the left eye and the right eye of a viewer, thereby the viewer recognizing the three-dimensional image. Next, a processing example of the image 30L for the left eye and the image 30R for the right eye individually being incident on the left eye and the right eye of the viewer is explained.

FIGS. 9A and 9B are display examples in which the individual images are incident on the left and the right eyes using the parallax barrier method. FIG. 9A shows the case of the three-dimensional display and FIG. 9B shows the case of the typical display that is not the three-dimensional display. In this example, a TFT liquid crystal display panel 61 is used as the display panel 60 and a switch liquid crystal panel 62 is interposed between the TFT liquid crystal panel 61 and a backlight 63. As shown in FIG. 9A, in the case of the three-dimensional view, the switch liquid crystal panel 62 is opaque at predetermined intervals so that light from the backlight 63 is selectively transmitted through the TFT liquid crystal panel 61. A pixel 61L for the left eye and a pixel 61R for the right eye are alternately arranged on the TFT liquid crystal panel 61, in which the pixel 61L for the left eye is driven with the video data for the left eye and the pixel 61R for the right eye is driven with the video data for the right eye.

Since the display panel is configured as described above, an optical path (shown with a dashed line) of the light transmitted to the pixel 61L for the left eye and an optical path (shown with a solid line) of the light transmitted to the pixel 61R for the right eye have different angles from each other, regarding the light illuminated from the backlight 63 and transmitted through the pixel by appropriately selecting the intervals of the switch liquid crystal panel 62 being opaque and intervals of arraying the pixel 61L for the left eye and the pixel 61R for the right eye. As a result, the image displayed with the pixel 61L for the left eye is incident on the left eye and the image displayed with the pixel 61R for the right eye is incident on the right eye, thereby the three-dimensional view being obtained.

In the case where the typical display which is not the three-dimensional view is performed using the display panel, the switch liquid crystal panel 62 is transparent as shown in FIG. 9B. The pixel 61L for the left eye and the pixel 61R for the right eye in the TFT liquid crystal panel 61 are driven and displayed using the same video data to display an image similar to that of the typical TFT liquid crystal display. In the case of the display according to the parallax barrier method shown in FIGS. 9A and 9B, the processing is performed such that the image for the left eye and the image for the right eye are arrayed alternately by one pixel and are displayed simultaneously on one liquid crystal panel. Therefore, it may be necessary for the video selection unit 31 in the television receiver 30 to perform combining processing of arranging the video data for the left eye and the video data for the right eye at one pixel interval.

FIG. 10 shows an example of the three-dimensional display using the liquid crystal shutter method. In this case, the viewer wears eyeglasses 71 in which liquid crystal shutters 71L and 71R are individually attached to the left and the right. In the eyeglasses 71, the left liquid crystal shutter 71L is switched to an opaque state and the right liquid crystal shutter 71R is switched to a transparent state in the case where the image for the right eye is displayed on the screen in the television receiver 30. Also, the right liquid crystal shutter 71R is switched to the opaque state and the left liquid crystal shutter 71L is switched to the transparent state in the case where the image for the left eye is displayed on the screen in the television receiver 30.

Further, an image 30a for the left eye, an image 30b for the right eye, an image 30c for the left eye,—are alternately displayed by one frame as the image displayed on the screen of the television receiver 30, and shutter control on the eyeglasses 71 is also performed in sync with such display. Since the display is performed in this manner, the viewer can view the three-dimensional image. In the case of the display according to the liquid crystal shutter method shown in FIG. 10, such processing as time-divisionally displaying the image for the left eye and the image for the right eye sequentially on one liquid crystal panel. Therefore it may be necessary for the video selection unit 31 in the television receiver 30 to perform processing of separating the video data for the left eye and the video data for the right eye and supplying time-divisionally to a circuit of a subsequent stage.

Figure 11:
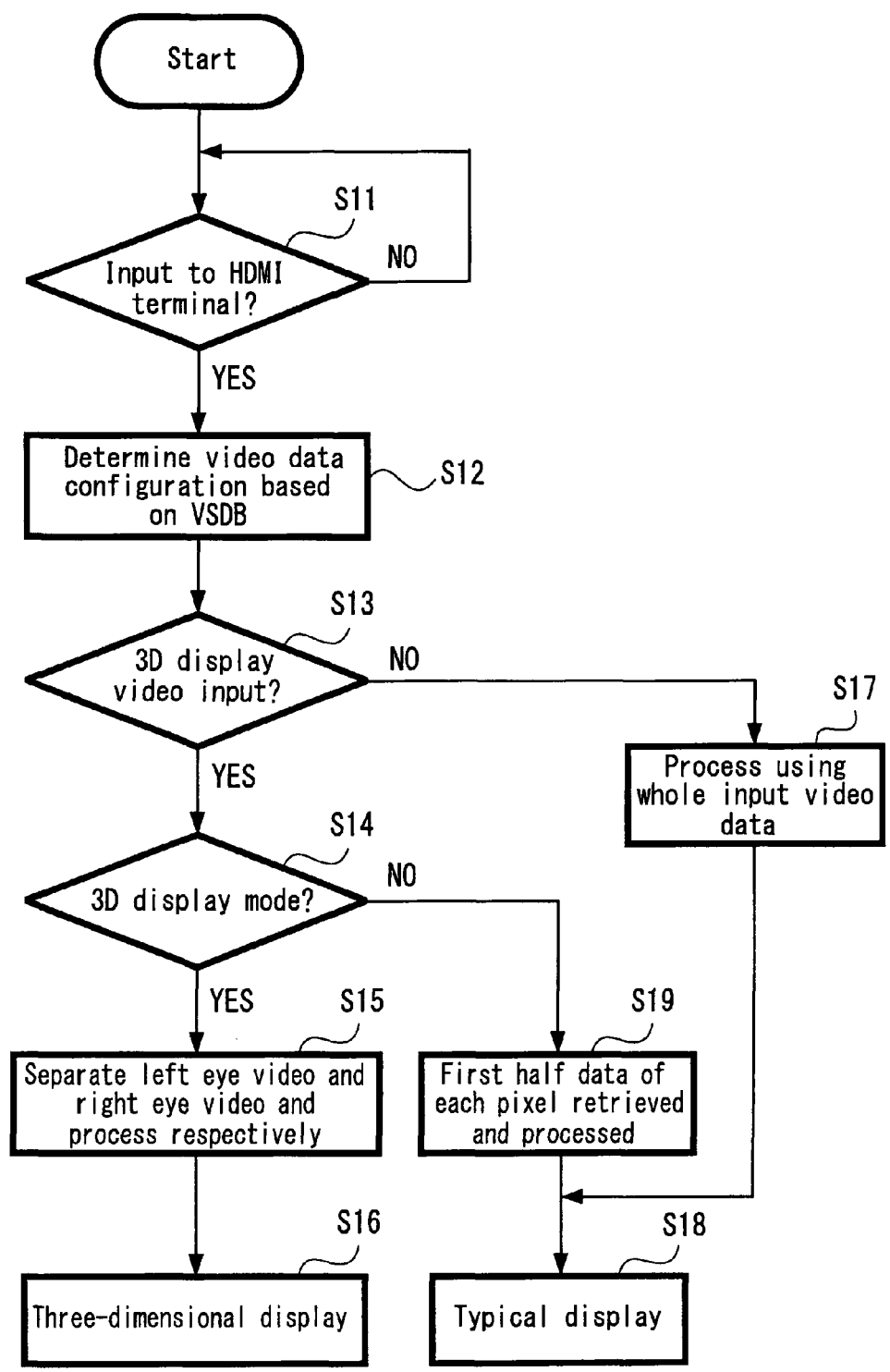
FIG. 11 is a flow chart showing an example of processing based on input data and input mode on a receiving side according to an embodiment of the present invention.

Next, referring to a flow chart shown in FIG. 11, an example of processing performed with the control of the control unit 36 is explained in the case where the video data is input to the HDMI terminal 41 in the television receiver 30 according to this embodiment. First, the control unit 36 detects whether video data is input to the HDMI terminal 41 (step S11), and stands by for the input. Here, in the case where it is determined that there is the input, configuration of the video data is detected from the VSDB data that is transmitted through the DDC channel (step S12). In the detection, it is detected whether the video data for three-dimensional display (specifically, the data having configuration shown in FIG. 6) is input (step S13). In the case where it is determined that the video data for three-dimensional display is input, it is detected whether a present video display mode of the television receiver 30 is a three-dimensional mode (3D display mode) (step S14). Here, in the case where it is determined that the three-dimensional mode has been set, the video data for the left eye and the video data for the right eye are separated (or combined) and corresponding display processing for three-dimensional image is performed (step S15) and the three-dimensional display shown in FIGS. 9A and 9B or FIG. 10 is performed, for example (step S16).

Further, in the case where it is detected at step S13 that the video data not for three-dimensional display is input, the video selection unit 31 transmits the video data directly to the circuit of the subsequent stage without performing processing such as selecting data or the like. The whole input video data is used and processed as the video data of one system (step S17). Typical display processing for 2D display is performed with the above-described processing (step S18).

In addition, in the case where it is detected at step S14 that the video display mode is not the three-dimensional mode, the video selection unit 31 selects only the first half data (more specifically, 8-bit data for the left eye) from the 8-bit data for the left eye and 8-bit data for the right eye in each pixel, which are the data transmitted with the data configuration shown in FIG. 6. Subsequently, the video selection unit 31 transmits the selected data to the circuit of the subsequent stage (step S19). Then, the display processing is performed on the first-half video data so that the typical display processing for 2D display is performed (step S18).

As described above, with the transmission processing according to this embodiment, the video data transmission for three-dimensional display and the video data transmission for typical display can be performed by connecting the source device and the sink device using the HDMI cable 1. Accordingly, the video data transmission for three-dimensional display can be performed with a simplified configuration in which only one set of connecting cables are used. Moreover, a basic transmission configuration used for the video data transmission for typical display shown in FIGS. 1 and 2 is also used for the video data transmission for three-dimensional display shown in FIG. 6, and therefore the video data transmission for three-dimensional display can be obtained in conformity with the HDMI standard. According to this embodiment, upon transmitting the video data for three-dimensional display, there is no deterioration occurred in resolution of the image displayed with respective video data.

Further, in the case of not performing three-dimensional view with the sink device while the video data for three-dimensional display is being transmitted, the display processing may be performed using only the data of the predetermined bits of the first half (or second half) for either the left eye or right eye, transmitted by one pixel, which is convenient for the user. In the case where the sink device (television receiver) incapable of performing the processing of the three-dimensional display is used, similarly, only half the data transmitted by one pixel may be obtained and used, while disregarding the remaining data.

It should be noted that the three-dimensional display processing is performed using one video display unit according to the embodiment described above. However, the three-dimensional display may be performed using two video display units in which the image display for the left eye and the image display for the right eye are individually performed.

Figure 12:
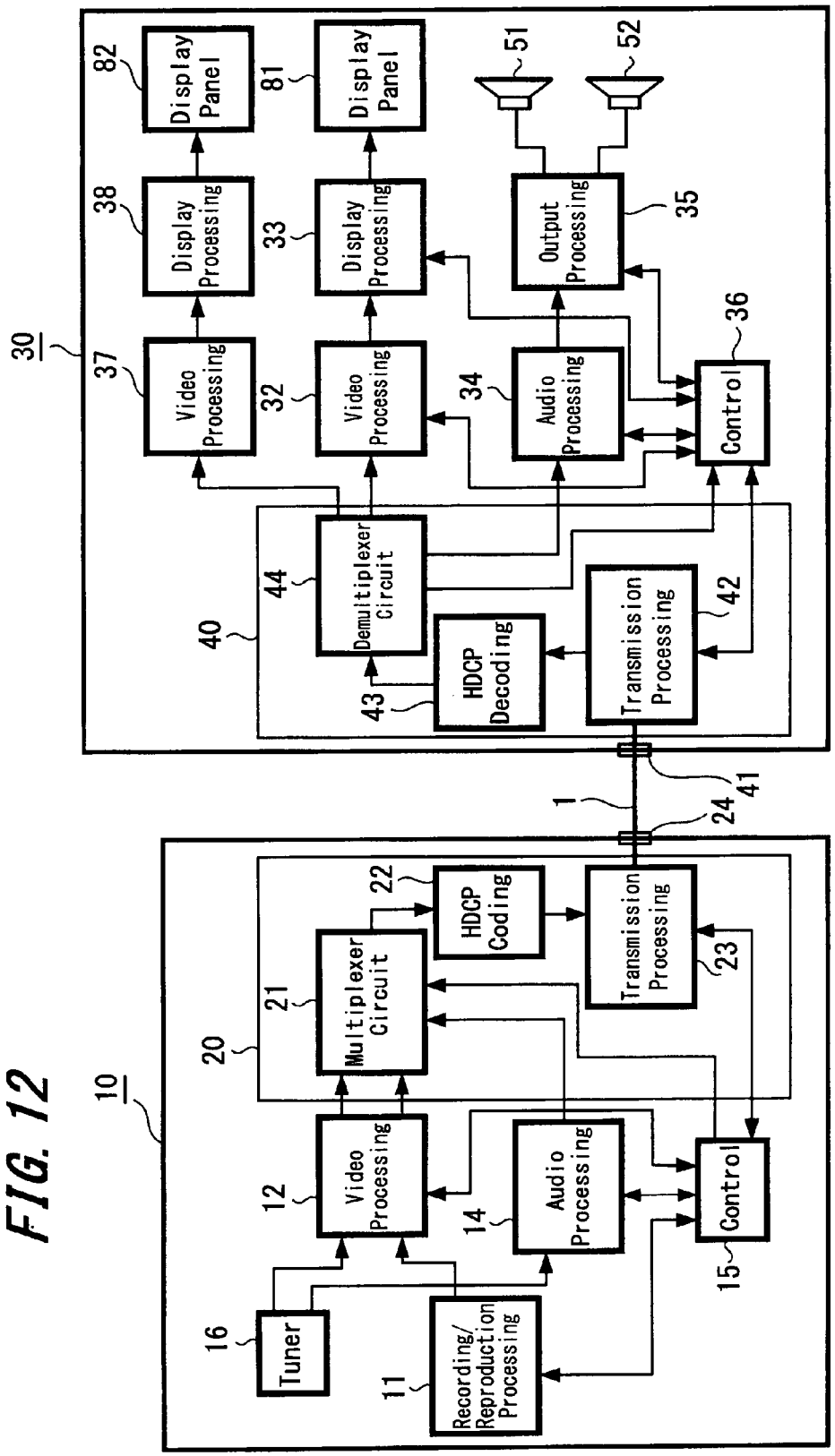
FIG. 12 is a block diagram showing an example of a system configuration according to another embodiment of the present invention.

FIG. 12 is a diagram showing an example of configuration of a communication system in such case. The configuration of the video recording/reproduction apparatus 10 is the same as the that shown in FIG. 3, and a difference from the television receiver 30 shown in FIG. 3 is a configuration of video display processing in a television receiver 30'. Specifically, the television receiver 30' includes two display panels 81 and 82 as the display panels, and the image for the left eye and the image for the right eye are individually displayed on the respective display panels 81 and 82.

The demultiplexer circuit 44 included in the HDMI transmission processing unit 40 separates the video data for the left eye and the video data for the right eye from the video data input via the HDMI cable. The separated video data for the left eye is processed in the video processing unit 32 and is processed in the display processing unit 33 to drive the display panel 81. The separated video data for the right eye is processed in a video processing unit 37 and is processed in a display processing unit 38 to drive the display panel 82.

Figure 13:
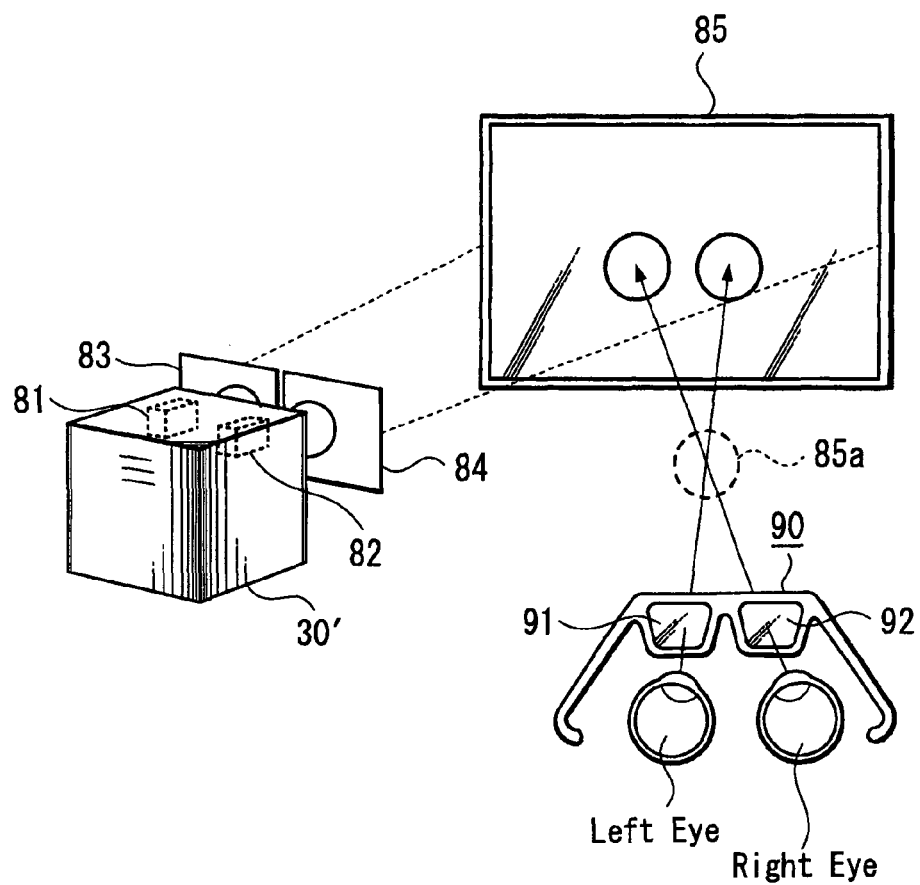
FIG. 13 is an explanatory diagram showing an example of a three-dimensional display according to a polarization method.

FIG. 13 shows an example of the three-dimensional view with the display on the individual display panels 81 and 82 as described above. In this embodiment, the display panels 81 and 82 are configured respectively as the display panels included in a video projector, and an image from the display panel 81 is projected onto a screen 85 via a polarization filter 83. An image from the display panel 82 is projected onto the screen 85 via a polarization filter 84. The polarization filter 83 and the polarization filter 84 have different polarizing directions.

The user views the image projected on the screen 85 using eyeglasses 90 with polarization filters. Polarization filters 91 and 92 respectively having different polarizing directions are arranged on the left and right of the glasses 90. Thus, an embodiment of the present invention can also be applied to the case where the three-dimensional display is performed using two video display units.

It should be noted that an example of transmitting data of 8 bits per pixel of each color is described above with reference to FIG. 6. However, an embodiment of the present invention may be applied to the case of transmitting video data for three-dimensional view having the other number of bits such as the data for the left eye and data for the right eye of 16 bits per pixel of each color, for example. In this case, the pixel clock periods necessary for transmitting one pixel is increased correspondingly, and the clock frequency is accordingly set high.

Also, an embodiment of the present invention is applied to the processing of transmitting the video data for three-dimensional view including the video data for the left eye and the video data for the right eye in the above, however, an embodiment of the present invention may also be applied to processing of simultaneously transmitting other two kinds of video data. For example, in the case where the video data is transmitted from a video signal source installed inside a vehicle to a display apparatus, two kinds of video data are arranged at positions of the video data for the left eye and video data for the right eye shown in FIG. 6 and are transmitted using one set of HDMI standard cables. Then, the two kinds of video data are displayed simultaneously on the display apparatus. The two kinds of video data are processed to be displayed such that a different kind of video can be seen depending on an eye direction viewing a screen of the display apparatus. For example, navigation video such as a road map is displayed in the case where the screen of the display apparatus is viewed from the diagonal right and a video program such as a motion picture is displayed in the case where the screen of the display apparatus is viewed from the diagonal left. The transmission processing according to an embodiment of the present invention can be applied to various kinds of processing in which a plurality of screens are displayed simultaneously.

Furthermore, an embodiment of the present invention can also be applied to other transmission standards similar to the above-described interface of the HDMI standard. Also, other source device and sink device than the recording/reproduction apparatus and television receiver shown in FIG. 3 may be connected using the cable of the HDMI standard.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication method of transmitting video data, using a system for transmitting the video data including a predetermined number of bits as a unit from a source device to a sink device in sync with pixel clock and using individual first transmission lines for respective color data or for luminance and color-difference signals and a second transmission line for the pixel clock, the communication method comprising:

preparing video data for three-dimensional display including the video data for a left eye and the video data for a right eye, as the video data transmitted from the source device to the sink device;

forming the video data for the left eye and the video data for the right eye including the predetermined number of bits per pixel, respectively;

adding one of the video data for the left eye and the video data for the right eye to the other thereof per pixel, the other video data including the predetermined number of bits, wherein the adding includes arranging the one of the video data and the other video data of one pixel, respectively, as a first half and a second half of a transmission period of one pixel;

forming the video data of one pixel including twice the predetermined number of bits and transmitting the video data at a timing in sync with the pixel clock; and transmitting the video data for three-dimensional display from the source device to the sink device on the individual first transmission lines and the pixel clock on the second transmission line, the pixel clock having a rate set in accordance with the transmission period, wherein an indication of whether or not the video data is intended for three-dimensional display is transmitted over a display data channel of an HDMI (high-definition multimedia interface), wherein the video data formed by adding one of the video data for the left eye and the video data for the right eye to the other thereof per pixel is transmitted from the source device to the sink device via a single HDMI cable.

2. A communication system comprising:

a source device and a sink device to which video data including a predetermined number of bits as a unit is transmitted from the source device in sync with pixel clock and using individual first transmission lines for respective color data or for luminance and color-difference signals and a second transmission line for the pixel clock, the source device including a video data preparing unit configured to prepare video data for a left eye and video data for a right eye as the three-dimensional display video data, respectively including the predetermined number of bits per pixel;

a combining unit configured to add one of the video data for the left eye and the video data for the right eye, which are prepared in the video data preparing unit, to the other thereof per pixel, in which the one of the video data and the other video data of one pixel, respectively, are arranged as a first half and a second half of a transmission period of one pixel, forming the video data including twice the predetermined number of bits per pixel; and a transmitting unit configured to transmit the video data including twice the predetermined number of bits per pixel, which is combined in the combining unit, to the individual first transmission lines in sync with the pixel clock on the second transmission line, the pixel clock having a rate set in accordance with the transmission period; and the sink device including a receiving unit configured to detect the video data received through the individual first transmission lines by twice the predetermined number of bits arranged in transmission periods of respective pixels in sync with the pixel clock transmitted on the second transmission line;

a separating unit configured to separate the video data including twice the predetermined number of bits received with the receiving unit into first-half bits and second-half bits, forming the video data for the left eye and the video data for the right eye by one pixel; and a display processing unit configured to perform display processing individually on the video data for the left eye and the video data for the right eye, wherein an indication of whether or not the video data is intended for three-dimensional display is transmitted over a display data channel of an HDMI (high-definition multimedia interface), wherein the video data formed by adding one of the video data for the left eye and the video data for the right eye to the other thereof per pixel is transmitted from the source device to the sink device via a single HDMI cable.

3. A communication system according to claim 2, wherein:
in the case where the sink device may not support the three-dimensional display, the separating unit retrieves the video data including the first-half bits or second-half bits from the video data including twice the predetermined number of bits per one pixel received in the receiving unit, and the display processing unit performs display processing on the video data including the predetermined number of bits per pixel retrieved in the separating unit.

4. A method of transmitting video data, using a system for transmitting the video data including a predetermined number of bits as a unit to a sink device in sync with pixel clock and using individual first transmission lines for respective color data or for luminance and color-difference signals and a second transmission line for the pixel clock, the method comprising:

preparing video data for three-dimensional display including the video data for a left eye and the video data for a right eye, as the video data transmitted to the sink device;

forming the video data for the left eye and the video data for the right eye including the predetermined number of bits per pixel, respectively;

adding one of the video data for the left eye and the video data for the right eye to the other thereof per pixel, the other video data including the predetermined number of bits, wherein the adding includes arranging the one of the video data and the other video data of one pixel, respectively, as a first half and a second half of a transmission period of one pixel; and forming the video data of one pixel including twice the predetermined number of bits and transmitting the video data on the individual first transmission lines at a timing in sync with the pixel clock on the second transmission line, the pixel clock having a rate set in accordance with the transmission period, wherein an indication of whether or not the video data is intended for three-dimensional display is transmitted over a display data channel of an HDMI (high-definition multimedia interface), wherein the video data formed by adding one of the video data for the left eye and the video data for the right eye to the other thereof per pixel is transmitted from the source device to the sink device via a single HDMI cable.

5. A transmission apparatus to transmit video data including a predetermined number of bits as a unit from a source device to a sink device in sync with pixel clock and using individual first transmission lines for respective color data and a second transmission line for the pixel clock, comprising:

a video data preparing unit configured to prepare video data for a left eye and video data for a right eye as the three-dimensional display video data including the predetermined number of bits per pixel, respectively;

a combining unit configured to add one of the video data for the left eye and the video data for the right eye, which are prepared in the video data preparing unit, to the other thereof per pixel, in which the one of the video data and the other video data of one pixel, respectively, are arranged as a first half and a second half of a transmission period of one pixel, forming the video data including twice the predetermined number of bits per pixel; and a transmission unit configured to transmit the video data including twice the predetermined number of bits per pixel that is combined in the combining unit to the individual first transmission lines in sync with the pixel clock on the second transmission line, the pixel clock having a rate set in accordance with the transmission period, wherein an indication of whether or not the video data is intended for three-dimensional display is transmitted over a display data channel of an HDMI (high-definition multimedia interface), wherein the video data formed by adding one of the video data for the left eye and the video data for the right eye to the other thereof per pixel is transmitted from the source device to the sink device via a single HDMI cable.

6. A transmission apparatus according to claim 5, wherein the pixel clock rate for the video data transmitted from the transmission unit is set twice the frequency of transmitting the video data not for three-dimensional display.

7. A method of receiving video data, using a system for transmitting the video data including a predetermined number of bits as a unit in sync with pixel clock and using individual first transmission lines for respective color data or for luminance and color-difference signals and a second transmission line for the pixel clock, the method comprising:

separating the video data including twice the predetermined number of bits arranged in transmission periods of respective pixels, each of the transmission periods including video data for a left eye including the predetermined number of bits added to video data for a right eye including the predetermined number of bits arranged, respectively, as a first half and a second half of the transmission period, received in sync with the pixel clock into first-half video data having the predetermined number of bits and second-half video data having the predetermined number of bits, the video data transmitted on the individual first transmission lines received in sync with the pixel clock transmitted on the second transmission line, the pixel clock having a rate set in accordance with the transmission period, and displaying individually one of the separated data as the video data for the left eye and the other thereof as the video data for the right eye to obtain three-dimensional display, wherein an indication of whether or not the video data is intended for three-dimensional display is transmitted over a display data channel of an HDMI (high-definition multimedia interface), wherein the video data formed by adding one of the video data for the left eye and the video data for the right eye to the other thereof per pixel is transmitted from the source device to the sink device via a single HDMI cable.

8. A receiving apparatus to receive video data, using a system of transmitting the video data including a predetermined number of bits as a unit in sync with pixel clock and using individual first transmission lines for respective color data or for luminance and color-difference signals and a second transmission line for the pixel clock, comprising:

a receiving unit configured to detect the video data received through the transmission line in sync with the pixel clock by twice the predetermined number of bits arranged in transmission periods of respective pixels, each of the transmission periods including video data for a left eye including the predetermined number of bits added to video data for a right eye including the predetermined number of bits arranged, respectively, as a first half and a second half of the transmission period, the received video data transmitted on the individual first transmission lines in sync with the pixel clock transmitted on the second transmission line, the pixel clock having a rate set in accordance with the transmission period;

a separating unit configured to separate the video data including twice the predetermined number of bits received in the receiving unit into first-half bits and second-half bits, forming the video data for the left eye and the video data for the right eye by one pixel; and a display processing unit configured to perform display processing individually on the video data for the left eye and the video data for the right eye, wherein an indication of whether or not the video data is intended for three-dimensional display is transmitted over a display data channel of an HDMI (high-definition multimedia interface), wherein the video data formed by adding one of the video data for the left eye and the video data for the right eye to the other thereof per pixel is transmitted from the source device to the sink device via a single HDMI cable.

9. A receiving apparatus according to claim 8, wherein the separating unit retrieves the video data including the first-half bits or second-half bits from the video data including twice the predetermined number of bits per one pixel received in the receiving unit, and the display processing unit performs display processing on the video data including the predetermined number of bits per pixel retrieved in the separating unit.

10. A receiving apparatus according to claim 8, wherein the display processing unit performs display processing on the video data for the left eye and the video data for the right eye displayed with one display unit.

11. A receiving apparatus according to claim 8, wherein the display processing unit performs display processing on the video data for the left eye and the video data for the right eye displayed with two display units individually.

\* \* \* \* \*